No. 828,546. PATENTED AUG. 14, 1906.
F. HART.
PERFORATING MACHINE.
APPLICATION FILED JULY 11, 1905.

Witnesses:
E. A. Vock.
R. W. Runser.

Inventor.
Frederick Hart,
by Wilhelm, Parker & Haid,
Attorneys.

No. 828,546. PATENTED AUG. 14, 1906.
F. HART.
PERFORATING MACHINE.
APPLICATION FILED JULY 11, 1905.

Witnesses:
E. A. Volk.
R. W. Rumser.

Inventor.
Frederick Hart.
by Wilhelm, Parker & Hard,
Attorneys.

No. 828,546.  
PATENTED AUG. 14, 1906.  
F. HART.  
PERFORATING MACHINE.  
APPLICATION FILED JULY 11, 1905.  
7 SHEETS—SHEET 5.

Witnesses:  
E. A. Vock  
R. W. Rumser

Inventor.  
by Frederick Hart,  
Wilhelm, Parker & Hart  
Attorneys.

No. 828,546. PATENTED AUG. 14, 1906.
F. HART.
PERFORATING MACHINE.
APPLICATION FILED JULY 11, 1905.

Witnesses:
E. A. Volk.
R. W. Rinser.

Inventor.
Frederick Hart,
by Wilhelm, Parker & Hart,
Attorneys

THE NORRIS PETERS CO., WASHINGTON, D. C.

UNITED STATES PATENT OFFICE.

FREDERICK HART, OF POUGHKEEPSIE, NEW YORK, ASSIGNOR TO RICHARD A. JONAS AND CHARLES S. JONAS, OF NEW YORK, N. Y.

PERFORATING-MACHINE.

No. 828,546.　　　Specification of Letters Patent.　　　Patented Aug. 14, 1906.

Application filed July 11, 1905. Serial No. 269,176.

*To all whom it may concern:*

Be it known that I, FREDERICK HART, a subject of the King of Great Britain, residing at Poughkeepsie, in the county of Dutchess and State of New York, have invented a new and useful Improvement in Perforating-Machines, of which the following is a specification.

This invention relates to machines for perforating sheets of paper or other thin material with rows or lines of perforations extending at predetermined distances across each sheet—as, for instance, in sheets which are used for check-books containing on each sheet several checks separated by rows of perforations.

The invention relates to improvements in a perforating-machine which consists in its general features of a perforating mechanism provided with punches, needles, or other devices which operate upon the sheets, endless tapes, strings, or aprons arranged in front of the perforating mechanism for conveying the sheets to the same, a drop-gage or front stop arranged in front of the perforating mechanism for stopping each incoming sheet and releasing it at the proper time to be conveyed by the feed tapes, strings, or aprons to the perforating mechanism when the latter is ready for the reception of the sheet, rear drop gages or stops arranged in rear of the perforating mechanism for stopping the sheet in the proper position to receive the perforations, and carrying tapes, strings, or aprons arranged in rear of the perforating mechanism for moving the sheets from one rear gage to another in order to receive successive lines of perforations and for finally discharging the sheets from the perforating mechanism.

The objects of the invention are to provide improved operating mechanisms for the perforating device and gages whereby the actions of these devices relative to each other are more accurately timed and will not be affected by the adjustments of the gages to produce the desired arrangements of the lines of perforations in the sheet, to so construct the gage-operating mechanism that the machine can be set quickly and conveniently to operate upon sheets of different sizes or in which the lines of perforations are to be differently arranged, and to improve the machine in other respects with a view to increasing its efficiency, accuracy, and general usefulness.

In the accompanying drawings, consisting of seven sheets, Fig. 4 is a side elevation thereof, partly in section. Fig. 4$^a$ is a horizontal section, on an enlarged scale, of the sheet-holding spring in line 4 4, Fig. 4. Fig. 5 is a sectional elevation, on an enlarged scale, of the rear portion of the trip-dog carrier. Fig. 6 is a horizontal sectional plan in line 6 6, Fig. 5. Fig. 9$^a$ is a similar view of the clutch mechanism, showing the initial position of the parts. Fig. 10 is a sectional elevation of the clutch mechanism in line 10 10, Fig. 9. Fig. 11 is a horizontal sectional plan of the clutch mechanism in line 11 11, Fig. 8. Fig. 12 is a broken plan view, partly in section, showing the clutch-controlling mechanism. Fig. 15 is a detail section of one of the clamps for the rear gages in line 15 15, Fig. 14. Fig. 16 is a sectional elevation in line 16 16, Fig. 13, showing the spacing-block for the gage-sleeve. Fig. 17 is a sectional elevation of the gage and clutch actuating mechanism in line 17 17, Fig. 13. Fig. 19 is a similar view showing a still different position of the parts. Fig. 19$^a$ is a section of the gage in line 19$^a$ 19$^a$, Fig. 14. Fig. 23 is a sectional plan in line 23 23, Fig. 21. Fig. 23$^a$ is a sectional elevation of the securing device for the setting-lever in line 23$^a$ 23$^a$, Fig. 23.

Like letters of reference refer to like parts in the several figures.

Figure 3:
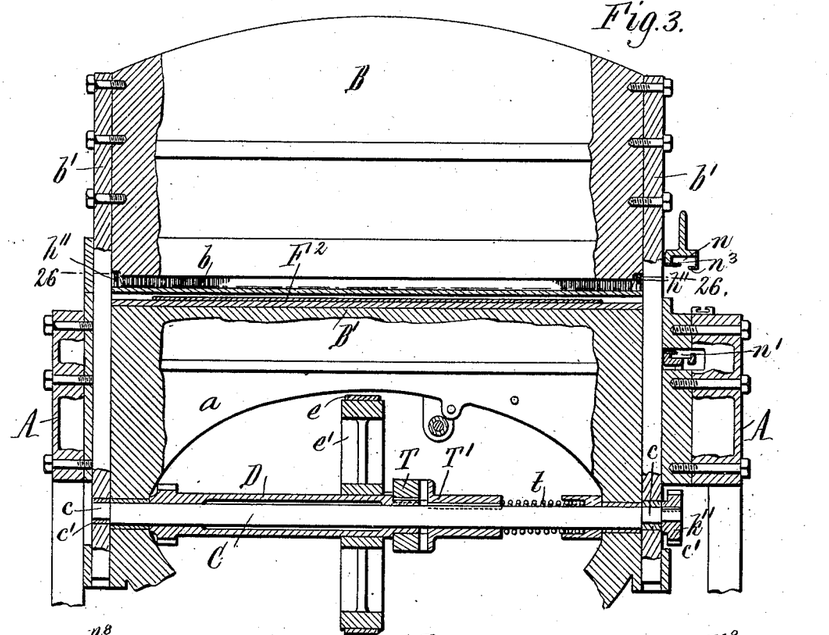
Fig. 3 is a transverse sectional elevation thereof in line 3 3, Fig. 1.

The main frame A of the machine may be of any suitable construction, that shown consisting of connected side frames and a transverse connecting yoke or portion $a$. The perforating mechanism also may be of any suitable construction as the desired style of work or other considerations may require. The perforating mechanism shown in the drawings is constructed as follows: B represents a vertically-reciprocating cross-head arranged transversely in the machine and provided at its lower side with punches, needles, or other tools $b$ for operating upon the sheets. B' represents the bed-plate arranged beneath the cross-head and provided, if necessary, with a die-plate. The cross-head is carried by upright side posts $b'$, which slide in suitable guides on the sides of the main frame, and is reciprocated from a horizontal shaft C, which is journaled in the lower portion of the yoke $a$ and is provided near its ends with cranks or eccentrics $c$, Fig. 3, working in boxes $c'$ at the lower ends of the side posts $b'$ of the cross-head to raise and lower the latter. This crank-shaft is normally stationary, but is coupled to and uncoupled from a continuously-rotating hollow shaft D by a clutch and actuating mechanisms which are controlled by the operating mechanism for the rear gages, as hereinafter described, so that the crank-shaft makes one revolution and reciprocates the cross-head once each time the sheet is arrested by the operation of one of the gages. This hollow drive-shaft D rotates about the crank-shaft C and is driven from a main drive-shaft E, journaled in the rear portion of the machine, as by a belt $e$, connecting belt-pulleys $e'$ $e^2$ on the hollow and main drive-shafts.

Figure 1:
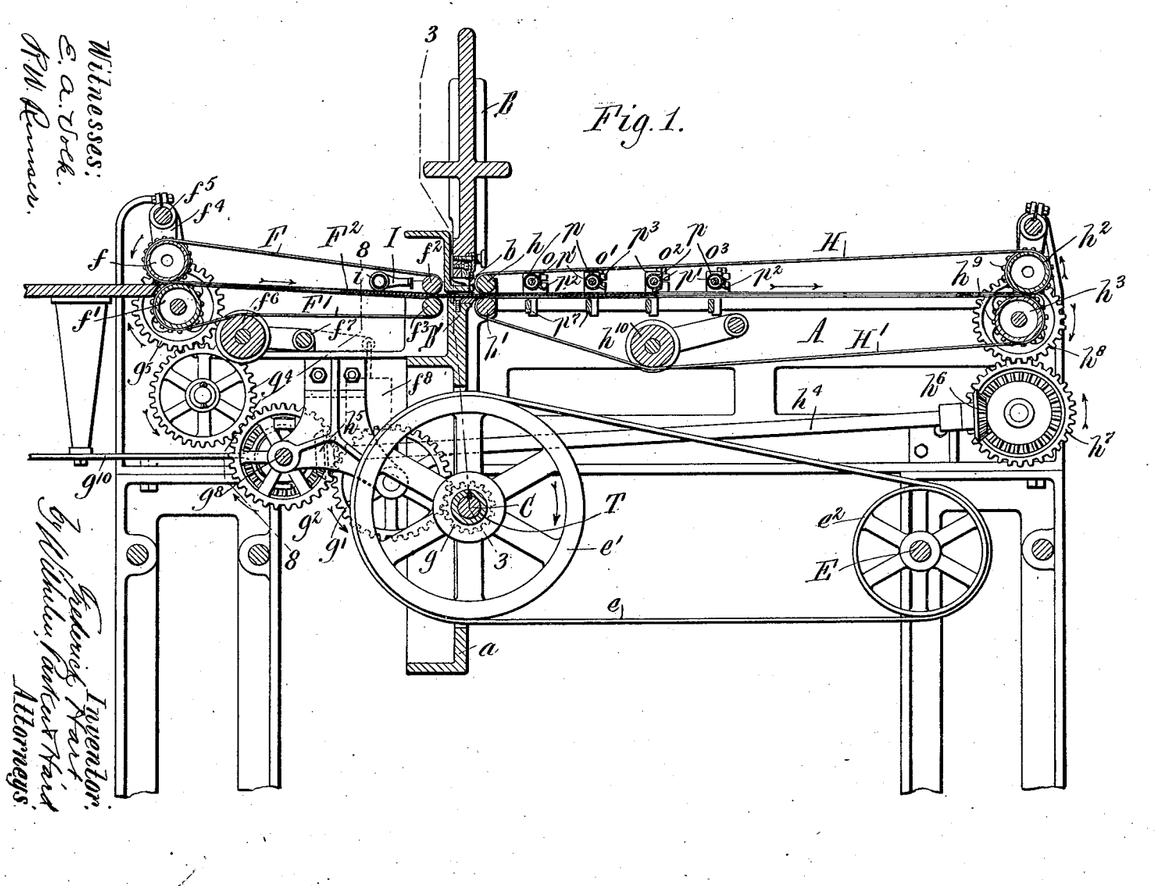
Figure 1 is a longitudinal sectional elevation of a perforating-machine embodying the invention.
Figure 2:
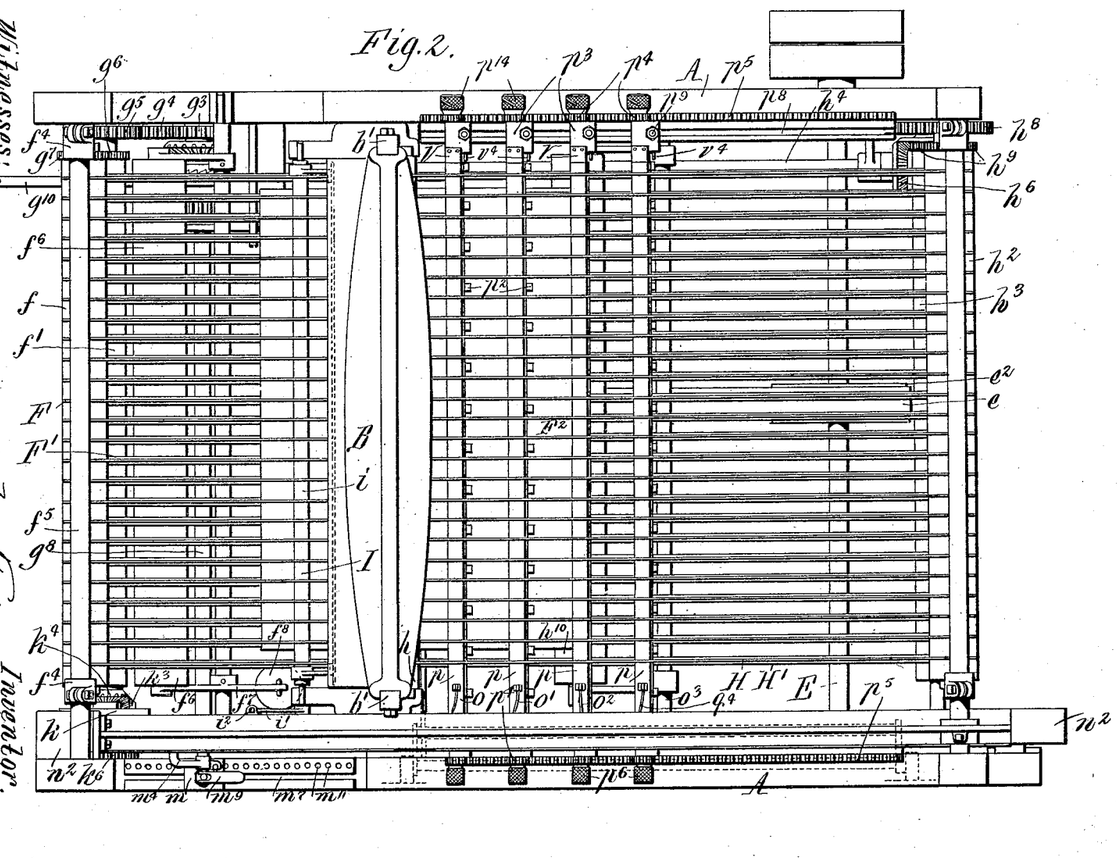
Fig. 2 is a plan view thereof.
Figure 7:
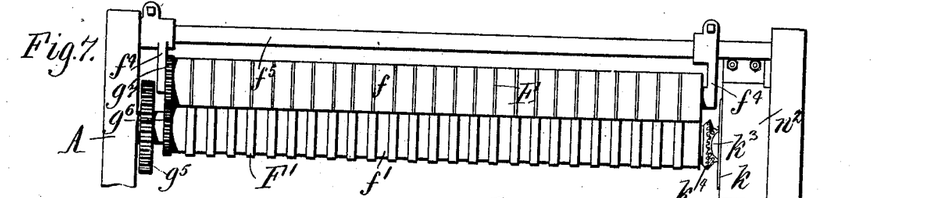
Fig. 7 is a front elevation of the front sheet-carrier.
Figure 8:
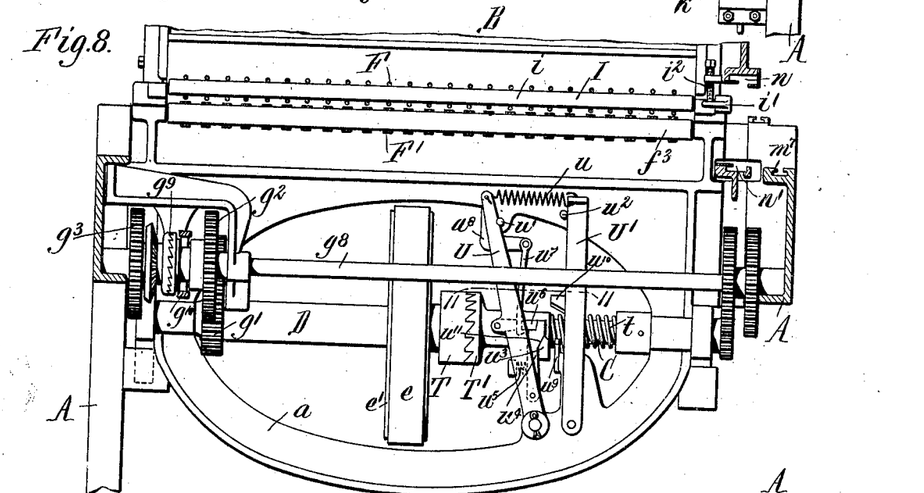
Fig. 8 is a fragmentary transverse sectional elevation of the machine in line 8 8, Fig. 1, looking toward the rear of the machine.

F represents the upper, and F' the lower, endless front feed aprons, tapes, or strings, which are arranged with their horizontal carrying portions adjacent to each other in front of the bed-plate B', so as to travel with their carrying portions from the front end of the machine toward the perforating mechanism and carry the sheets $F^2$ between them to the same. These endless feed-carriers run around upper and lower front rollers $f$ $f'$ and upper and lower rear rollers $f^2$ $f^3$, respectively. Any usual or suitable means may be employed for tightening the feed-tapes, so that they will properly feed the sheets. As shown, the upper front roller is journaled at its ends in arms $f^4$, having split upper ends clamped about a transverse frame-rod $f^5$, which construction permits the arms to be secured at such angle as may be necessary to tighten or slacken the upper feed-tapes and cause them to properly bear on the sheets resting on the lower tapes. The lower front tapes are kept taut automatically and retained at the proper distances apart by a grooved roller $f^6$, journaled in a rocking frame $f^7$, Figs. 1 and 2, provided with a weight $f^8$, which presses the tightener-roller up against the under runs of the lower tapes. These carriers may be driven by any suitable mechanism—for instance, as shown in Figs. 1, 7, and 8, by gear-wheels $g$ $g'$ $g^2$ $g^3$ $g^4$ $g^5$, connecting the hollow shaft D with the lower front roller $f'$, and gear-wheels $g^6$ $g^7$, connecting the lower and upper front carrier-rollers. Preferably the two gear-wheels $g^2$ $g^3$ are loosely mounted on an axle or shaft $g^8$, Fig. 8, and their hubs are provided with coöperating clutch-teeth $g^9$. The wheel $g^2$ can be slid on its axle to engage and disengage the clutch-teeth without throwing the gear-wheel out of mesh with its driving gear-wheel $g'$. A hand-lever $g^{10}$, Figs. 1 and 8, extending to the front of the machine, is connected to the sliding gear-wheel $g^2$, and by operating this lever the gear-wheel $g^2$ can be uncoupled from the gear-wheel $g^3$ and the sheet-carriers thus stopped whenever this is necessary or desirable for any reason.

H H' represent the rear carrying aprons, tapes, or strings arranged in rear of the perforating mechanism and running around upper and lower front rollers $h$ $h'$ and upper and lower rear rollers $h^2$ $h^3$. These carriers may be driven by any suitable mechanism—for instance, as shown in Figs. 1 and 2, by a shaft $h^4$, arranged longitudinally at one side of the machine and connected by bevel-gearing $h^5$ at its front end with the gear-wheel $g^3$ and by bevel-gearing $h^6$ at its rear end and gear-wheels $h^7$ $h^8$ with the lower rear roller $h^3$ of the rear carriers. The upper and lower rear rollers $h^2$ $h^3$ are connected so that the upper roller is positively driven, as by gear-wheels $h^9$, one of which is shown in Fig. 2. The upper rear carrier-tapes are preferably tensioned similarly to the upper front carrier-tapes by adjusting the upper rear roller $h^2$, and a swinging tightener-roller $h^{10}$ is provided, which bears down on the lower runs of the lower rear tapes and automatically maintains the desired tension of the latter.

To prevent the rear carriers from pulling on the sheets and tearing them while being perforated, the front roller $h$ of the upper carrier is so mounted that when the cross-head descends to perforate the sheet the roller $h$ is lifted from the sheet. Any desired or suitable mechanism may be employed for this purpose. As shown in the drawings, the roller is journaled in levers $h^{11}$, Figs. 3, 26, and 27, which are guided vertically by the frame and are fulcrumed at $h^{12}$ on the frame with their free ends extending in the path of the reciprocating cross-head. When the latter descends to perforate the sheet, it strikes the free ends of the levers $h^{11}$ and lifts the roller $h$ off of the sheet, so that when the needles or tools engage the sheet there is no rearward pull thereon and the tools will make sharp clean perforations. As the tools recede from the sheet the roller $h$ again descends by gravity into operative engagement with the sheet.

Figure 25:
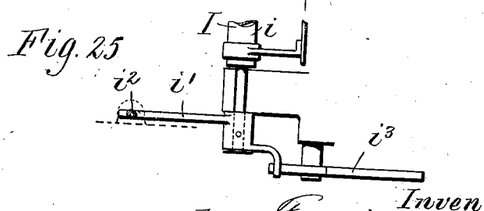
Fig. 25 is a plan view thereof, partly in section.
Figure 26:
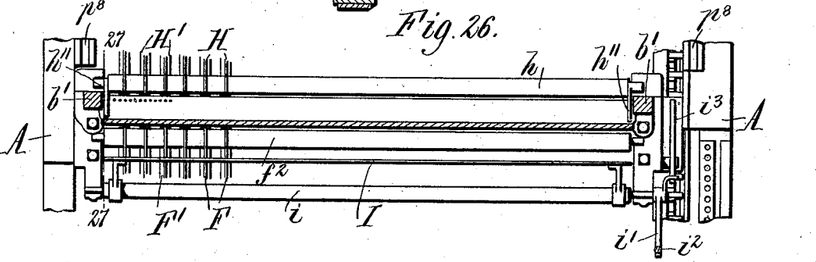
Fig. 26 is a plan view, partly in horizontal section, in line 26 26, Fig. 3, showing portions of the front and rear sheet-carriers.
Figure 27:
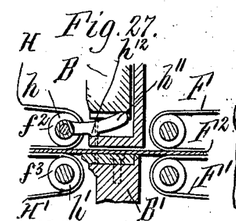
Fig. 27 is a sectional elevation, on an enlarged scale, in line 27 27, Fig. 26.
Figure 28:
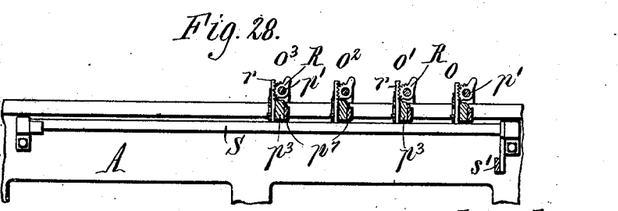
Fig. 28 is a sectional elevation of the clutch-controlling mechanism.

I, Figs. 1, 2, and 26, represents the front gage or stop arranged a suitable distance in front of the perforating mechanism and adapted to arrest the forward movement of each sheet before the same reaches the perforating mechanism and to release the sheet at the proper time for feeding it by the front carriers to the perforating mechanism. The front gage is operated by an intermittently-moving mechanism which is preferably constructed as follows: As shown in the drawings, the front gage is mounted upon a rock-shaft $i$ and drops by gravity into the path of the sheets to arrest them. The rock-shaft is journaled on the frame above the path of the sheets and is provided at one end with a lever $i'$, one end of which is adapted to strike an adjustable stop-screw $i^2$, Figs. 4, 8, and 25, ot limit the drop of the gage. The other end of the lever $i'$ is engaged by the rear arm of an operating-lever $i^3$ pivoted between its ends one side of the frame. By depressing the at front arm of the operating-lever $i^3$ the lever $i'$ and the rock-shaft are oscillated to lift the gage.

Figure 13:
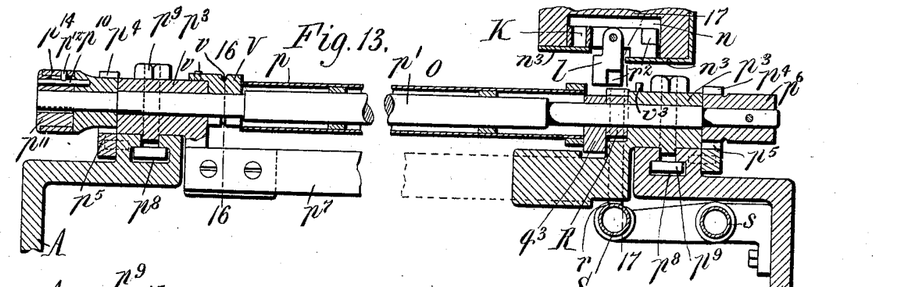
Fig. 13 is a broken sectional elevation, on an enlarged scale, of one of the rear gages and associated parts.
Figure 14:
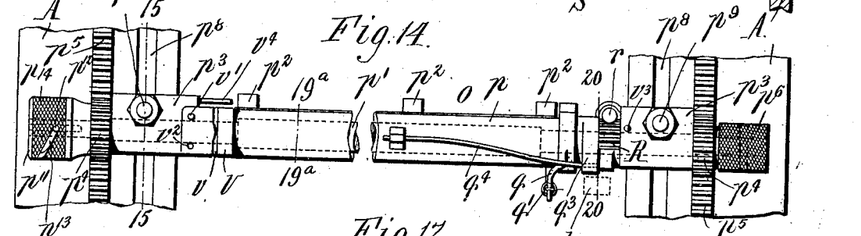
Fig. 14 is a broken plan view, on an enlarged scale, of one of the rear gages.

K, Figs. 2, 4, 5, 21, and 23, represents an intermittently-moving carrier for the trip-dogs, arranged at the same side of the machine as the front-gage-operating lever, and preferably consisting of an endless sprocket-chain passing around sprocket-wheels $k$ $k'$ at the front and rear ends of the machine. The rear sprocket-wheel $k'$ rotates loosely on a suitable stud-shaft $k^2$, Figs. 4 and 6, which is adjustably secured to the frame for properly tensioning the dog-carrier. The front sprocket-wheel $k$ (see Fig. 13) is journaled to rotate on the shaft of the lower front roller of the front carrier and is provided with planetary bevel gear-wheels $k^3$, which are arranged between and mesh with a bevel gear-wheel $k^4$, secured to said tape-roller, and an oppositely-disposed bevel gear-wheel $k^5$, which is also loose on the shaft of said feed-roller and has secured thereto or is formed with a gear-wheel $k^6$. This gear-wheel $k^6$ is driven in a direction opposite to that of the feed-roller each time the crank-shaft C is rotated to operate the perforating mechanism by suitable means, such as gear-wheels $k^7$ $k^8$ $k^9$ $k^{10}$ $k^{11}$, connecting it with said crank-shaft C. The opposite rotation of the bevel-gears $k^4$ $k^5$ on the opposite sides of the planetary gears $k^3$ causes the sprocket-wheel $k$, to which the planetary gears are secured, to remain stationary whenever the crank-shaft and perforating mechanism are in operation, whereas when the gear-wheel $k^6$ and bevel-gear $k^5$ are held stationary by the non-rotation of the crank-shaft C the sprocket-wheel $k$ is caused to rotate in the same direction as the feed-roller. Thus the dog-carrier is moved forwardly when the sheet is moving and the perforating mechanism is inactive and is held at rest while the sheet is stationary and during the action of the perforating mechanism. The drive-gearing for the trip-dog carrier is so proportioned that the carrier travels at the same speed at the feed-carriers and sheets.

The dog-carrier is provided with a series of pivoted trip-dogs $l$, which normally lie in a horizontal or inactive position, but are turned into a vertical or active position, so that they will strike and depress the rear arm of the gage-operating lever $i^3$ in passing over it. The trip-dogs are arranged closely together on the carrier, and as the latter moves along certain of the dogs are automatically turned up into active position at the proper distances apart. The distance between the active dogs will be greater or less according to the length of the sheets being operated upon and should be equal to the length of the sheet plus the distance required between successive sheets. The dogs are turned into and out of active position by the means shown in Figs. 4, 21 to 23$^a$.

Figures 23, 23A:
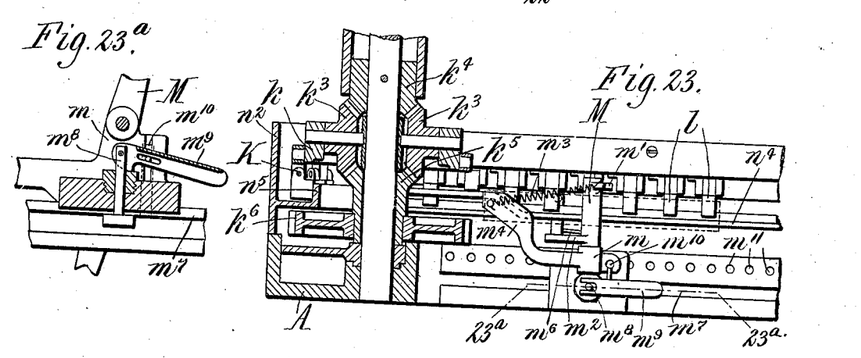
Figure 24:
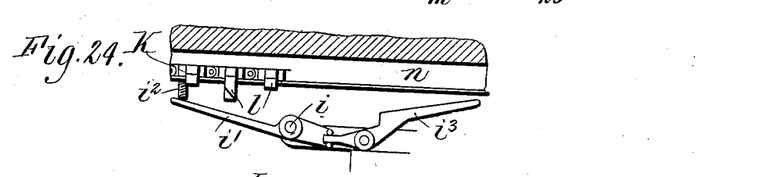
Fig. 24 is a detail sectional elevation, on an enlarged scale, of the actuating device for the front gage.

M represents a dog-setting lever which is pivoted on an adjustable fulcrum-block $m$ and has an arm $m'$ extending up to a point just beneath the upper run of the dog-carrier and an arm $m^2$ depending below the lower run of the dog-carrier. The setting-lever is returned to the position shown after being oscillated by a spring $m^3$, connecting its upper arm to a fixed arm $m^4$ on the fulcrum-block. The lower arm of the lever is provided with an upwardly-extending finger $m^5$, adapted to engage a dog and turn it up into vertical position each time the setting-lever is oscillated. The finger $m^5$ is preferably pivoted on the setting-lever and is held yieldingly in the upright position shown by a spring $m^6$, which connects the finger and setting-lever and presses a stop-lug $m^\times$ on the finger against the lower arm of the setting-lever. This construction enables the finger to yield in case it should be raised in advance of and should be struck by one of the dogs. When a trip-dog which has been turned up into vertical position passes around the sprocket-wheel $k$, it will depend from the upper run of the carrier in position to strike and move the upper arm $m'$ of the setting-lever as it passes the same, so that each dog oscillates the setting-lever and causes it to raise a succeeding dog. The distances between the successive active trip-dogs will be the same so long as the position of the setting-lever is not changed. By adjusting the setting-lever toward or from the sprocket-wheel $k$ dogs at shorter or longer intervals will be set in active position, thus adapting the machine for operation upon sheets of different lengths. The setting-lever may be adjustably secured in any suitable manner. As shown, the fulcrum-block $m$ rests on a slotted guide $m^7$ and has a clamp-bolt $m^8$ provided with a head located in an undercut portion of the guide-slot and with an operating cam-lever $m^9$. To the latter is also connected a slide-pin $m^{10}$, Figs. 23 and 23$^a$, adapted to enter either of a series of holes $m^{11}$ in the top of the guide $m^7$. By raising the cam-lever the fulcrum-block is unclamped and the pin $m^{10}$ raised out of the hole in which it is engaged. The fulcrum-block, with the setting-lever, can then be moved to the desired position and secured by turning down the cam-lever. The slide-pin and holes gage the positions of the setting-lever, and the clamp prevents any movement of the fulcrum-block when secured. The upper and lower runs of the dog-carrier are guided in upper and lower ways $n$ $n'$, which are arranged on the frame between the sprocket-wheels $k$ $k'$ for the carrier and are connected at their ends by semicircular cover-plates $n^2$, inclosing the outer portions of the sprocket-wheels. The ways are wide enough for the passage of the dogs in the horizontal position, and the upper way has bottom plates $n^3$, forming between them a slot through which the dogs depend when in the vertical or active position and which holds the dogs in the active position.

Figures 4, 4A, 5, 6:
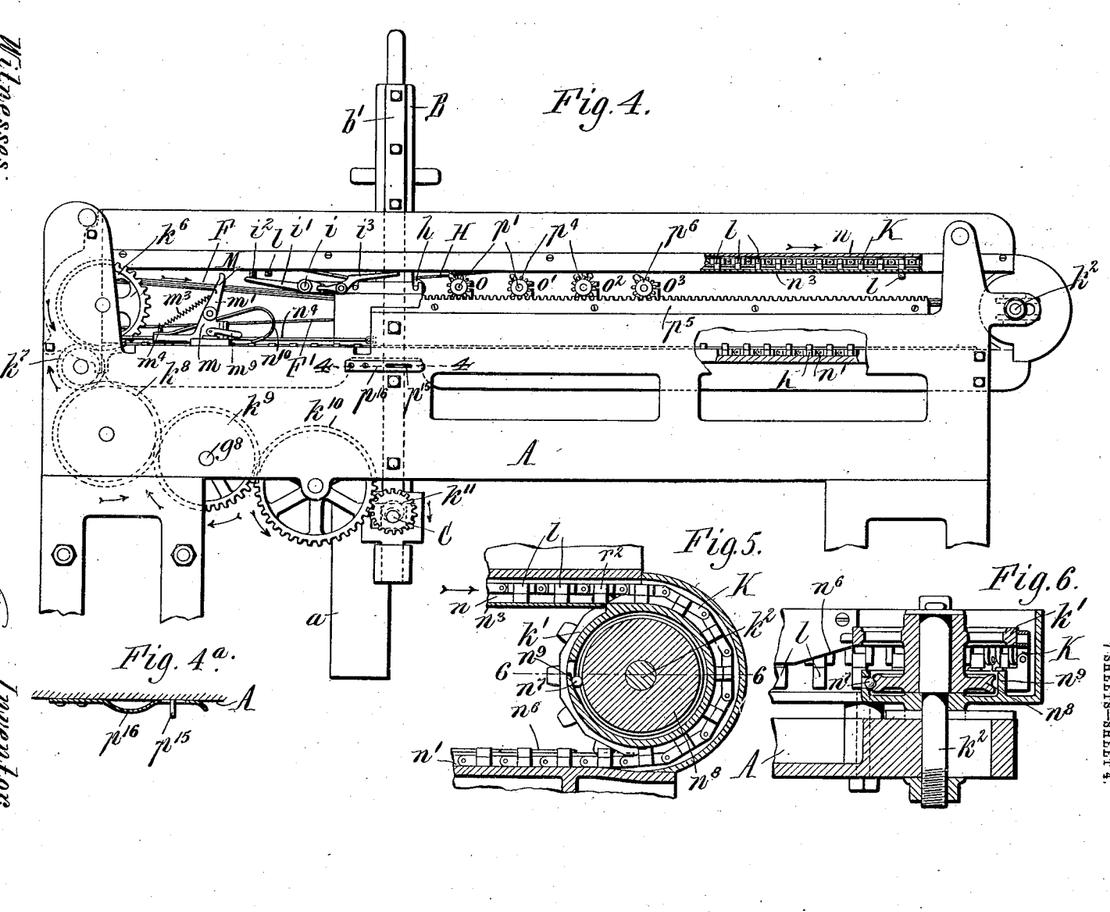
Figure 21:
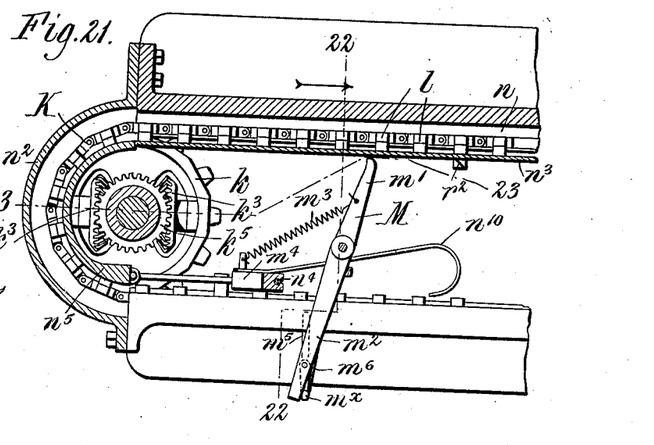
Fig. 21 is a sectional elevation, on an enlarged scale, of the front portion of the trip-dog carrier and associated parts.
Figure 22:
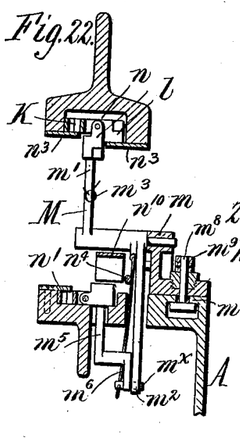
Fig. 22 is a sectional elevation in line 22 22, Fig. 21.

$n^4$, Figs. 4, 21, and 23, is a guide-cord arranged adjacent to the lower run of the dog-carrier and secured at its rear end to a portion of the frame and at its front end to a semicircular guide-flange $n^5$ on the cover-plate $n^2$ for the front sprocket-wheel. Between its ends the cord passes through and is adapted to slip in an oblique hole in the arm $m^4$ of the fulcrum-block for the dog-setting lever. In rear of this arm $m^4$ the guide-cord is held far enough from the dog-carrier to allow the dogs to retain their horizontal position, while in front of the arm the cord is held nearer to the dog-carrier, so that the trip-dogs, which are set in upright active position, are held in such position by the guide-cord and curved guide-flange $n^5$ until they reach the cover around the front sprocket-wheel and enter the slot of the upper way for the dog-carrier. After the trip-dogs pass around the rear sprocket-wheel they strike an inclined face $n^6$, Fig. 6, on a flange-plate of the lower way and are thereby thrown down to the normal horizontal position. To hold the dog-carrier positively from backward movement or play, a clutch-ball $n^7$, Figs. 5 and 6, is preferably interposed between a grooved circular disk $n^8$ on the rear sprocket-wheel $k'$ and an inclined face on a flange $n^9$ on the rear cover-plate, which encircles the flange of the sprocket-wheel.

$n^{10}$, Figs. 4, 21, and 23, is a bent spring-plate secured to the supporting-block of the dog-setting lever and beneath the free end of which the trip-dogs pass. This spring-plate will turn down any dog which may be slightly raised.

Each active dog actuates the front-gage-operating lever and lifts the gage as it passes the lever, and as the active dogs are spaced as stated and travel at the same speed as the sheets the operations of the gage are timed to insure the proper feeding of the sheets to the perforating mechanism.

O O' O$^2$ O$^3$, Figs. 1, 2, 4, 13, and 14, represent the rear gages or stops, which are arranged in rear of the perforating mechanism for arresting each sheet successively in the proper positions to receive successive transverse lines of perforations at the desired distances apart. These rear gages are held normally in an elevated position, and each gage is lowered at the proper time to arrest the sheet and hold it in position while the mechanism perforates the sheet. A greater or less number of these gages may be used in accordance with the number of lines of perforations which are to be formed in the sheet. When the front gage has been lifted to feed a sheet to the perforating mechanism, the front rear gage is dropped, so that the sheet which is being fed to the perforating mechanism is arrested by this rear gage and held in position while the cross-head descends and the line of perforations is formed and until the sheet is released from the perforating mechanism by the following upward movement of the cross-head. The first rear gage is then raised and releases the sheet, which is now fed onward by the rear carriers against the second rear gage, which has been lowered in time to arrest the sheet in the proper position to receive the second line of perforations. This operation is repeated with reference to every one of the rear gages until all the desired lines of perforations have been formed in the sheet. The raising of the last rear gage releases the sheet, which is then removed by the rear carriers. Each rear gage is adjustable toward and from the perforating mechanism, so that the gages can be set to form the perforations at the desired distance from the front end of the sheet and at the desired distances apart. The mechanism shown for supporting and adjusting these gages is constructed as follows: Each gage consists of a hollow sleeve $p$, journaled to rock on an inclosed supporting-shaft $p'$ and having projecting fingers or lugs $p^2$ for engaging and arresting the sheets. The supporting-shaft (see Figs. 13 and 14) is journaled near its ends in adjustable bearing-blocks $p^3$ and is provided outside of the bearing-blocks with gear-pinions $p^4$, which mesh with stationary toothed racks $p^5$ on the sides of the frame. The shaft has milled heads $p^6$ at its extremities for turning it and causing the pinions to roll along the toothed racks. The two bearing-blocks $p^3$ are connected by a cross-bar $p^7$, arranged below the gage-sleeve, and are guided by ribs engaging in horizontal ways or slots $p^8$ in the sides of the frame. They are secured in position by clamp-bolts $p^9$, passing through the blocks and provided with heads engaging in undercut portions of the guideways $p^8$ and nuts at their upper ends for drawing the heads of the bolts up against the flanges of the ways. The bearing-blocks are split, and the clamp-bolts also serve to contract the portions of the blocks about the gage-shaft $p'$ to hold the latter from turning. When the clamp-bolts are loosened, the gage-shaft can be turned in its bearings and the intermeshing pinions, and racks will cause a corresponding movement of both ends of the shaft, thus always maintaining the parallelism of the gage in its different adjustments. After adjustment the bearing-blocks are secured and the gage-shaft clamped against turning by tightening up the clamp-bolts $p^9$. It sometimes happens that the printing on the sheets is not exactly parallel with the edge of the sheet, and in that case in order to make the rows of perforations parallel with the printed matter the gages must be set at a slight obliquity to hold the sheets at a corresponding angle to the line of feed. For this purpose one of the gear-pinions $p^4$—for instance, that at the left-hand end of the shaft in Figs. 13 and 14—is loose on the gage-shaft and is releasably connected thereto, as by a slide-bolt $p^{10}$, working in a hole in a fixed collar $p^{11}$ on the shaft and adapted to engage in a hole in the pinion. The bolt has a pin $p^{12}$ entering an inclined slot $p^{13}$ in a rotatable ring $p^{14}$, surrounding the collar $p^{11}$. By turning the ring $p^{14}$ the bolt can be withdrawn from its hole in the pinion $p^4$, and the latter uncoupled from the shaft. When the pinion is free, the gage-shaft can be moved slightly from its true transverse position for the purpose explained.

The gages can be conveniently placed in the proper position by marking the lines of perforations on a sheet of paper and slipping the sheet against a stop-pin $p^{15}$, Figs. 4 and 4ª, on the side of the frame and behind a clamping-spring $p^{16}$, which holds the sheet in position while the gages are being set.

Figures 15, 16, 17, 19, 19A:
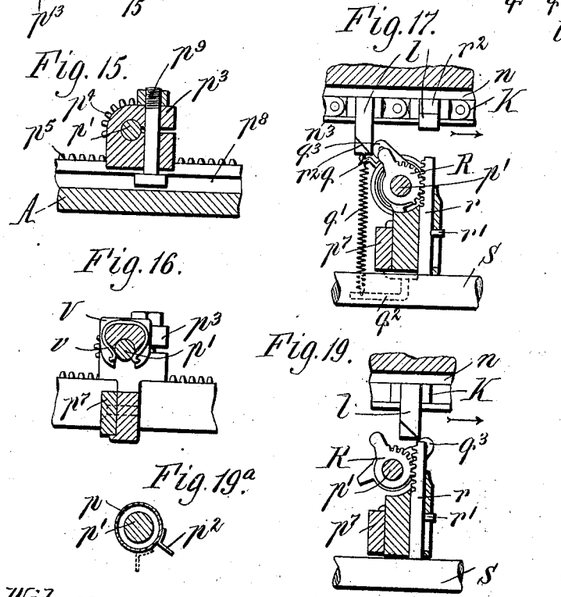
Figure 18:
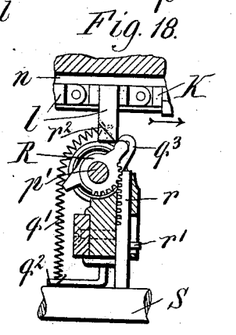
Fig. 18 is a similar view showing a different position of the parts.
Figure 20:
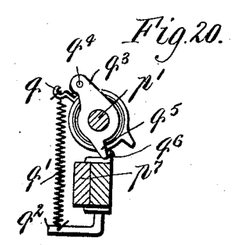
Fig. 20 is a sectional elevation of the gage-actuating device in line 20 20, Fig. 14.

The rear gages are operated in succession by the intermittently-traveling trip-dogs $l$, which operate the front gage, preferably through the following means: Each rear-gage sleeve is provided at one end with a fixed arm $q$, Figs. 14, 17, and 18, connected by a suitable spring $q'$ with a stationary arm or projection $q^2$ on the adjacent bearing-block for the gage. This spring holds the gage-sleeve in the normal position with its fingers elevated and returns the sleeve and fingers after operation by the traveling trip-dogs. $q^3$ is a rock-arm, preferably loose on the gage-shaft adjacent to one end of the gage-sleeve and connected to the latter by a spring-rod $q^4$, Fig. 14, which causes the sleeve to rock with the arm, but permits it to yield somewhat relative to the arm. The rock-arm $q^3$ has a projection $q^5$, Fig. 20, adapted to engage a stop pin or part $q^6$ on the adjacent bearing-block for the gage-shaft to limit the return movement of the gage-sleeve by its spring. The rock-arm $q^3$ extends up toward the upper run of the dog-carrier in the path of the depending active trip-dogs, so that each active dog in passing engages and rocks the arm $q^3$ from the position shown in Fig. 17 to that shown in Fig. 18, thereby rocking the gage-sleeve to lower its fingers into position to arrest the sheet. The dog-carrier is stopped when the dog reaches the position shown in Fig. 19 and remains stationary, holding the gage down, while the perforating mechanism is operated to perforate the sheet and then starts again, so that the trip-dog passes and releases the rock-arm, permitting the return of the arm and gage under the action of the spring $q'$.

Figure 9:
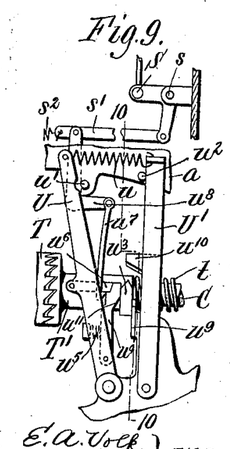
Fig. 9 is an elevation of the clutch mechanism, showing the clutch members partially disengaged.
Figures 9A, 10, 11, 12:
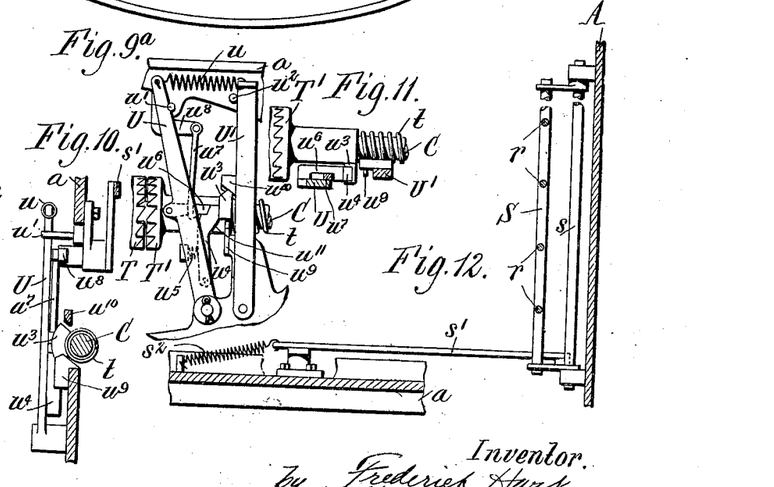

The mechanism shown for starting and stopping the trip-dog carrier is constructed as follows, (see Figs. 12 to 14, 17 to 19, and 28:) R represents a gear-segment mounted loosely on each gage-shaft beside the rock-arm $q^3$ and having teeth meshing with teeth on an upright plunger or rack $r$, which slides in a guide in the adjacent bearing-block for the gage-shaft and the movements of which are limited by a pin $r'$ thereon entering a slot in the bearing-block. The gear-segment has an arm which extends toward the path of the active trip-dogs $l$ on the upper run of the dog-carrier and is engaged and rocked by each active trip-dog with the rock-arm $q^3$, beside which it is located. The arm of the gear-segment R is somewhat shorter than the rock-arm $q^3$ and the trip-dog has a beveled face $r^2$ opposite the end of the gear-segment arm, so that the latter is released by the trip-dog after lowering the plunger and is permitted to return while the rock-arm $q^3$ is still engaged by the dog. The plungers $r$ for the several gages rest at their lower ends on a horizontal bar S, arranged longitudinally of the machine and connected to a rock-shaft $s$, journaled on the adjacent side of the frame. The rock-shaft $s$ is connected to a clutch mechanism for connecting the operating crank-shaft C for the perforating mechanism with its hollow drive-shaft D, and each time the bar S is depressed by either of the plungers $r$ the clutch is operated to couple the shafts for one revolution. As shown in Figs. 9 and 12, the rock-shaft $s$ has a depending arm connected to one end of a rod $s'$, which extends horizontally inward and is connected by a suitable spring $s^2$ with the frame-yoke $a$. This spring acts to return the bar, plunger $r$, and gear-segment when released by the trip-dog.

Any suitable clutch mechanism may be employed, which when tripped will connect the crank-shaft C of the perforating mechanism to the hollow drive-shaft D and automatically release it after one complete revolution. The clutch mechanism shown in the drawings is constructed as follows, (see Figs. 7 to 11:) T represents a clutch member formed on or secured to the hollow drive-shaft D and having teeth interlocking with teeth in a coöperating clutch member T', which is splined or otherwise slidably mounted on the crank-shaft C, so as to turn therewith. The sliding clutch member T' is pressed toward the other member by a spring $t$, surrounding the crank-shaft between the bearing therefor and the sliding clutch member. U represents a clutch-shifting lever pivoted at its lower end on the frame-yoke and extending up beside the hub of the sliding clutch member, and U' an upright safety-lever also pivoted at its lower end to the frame-yoke. The upper ends of these levers are connected by a strong spring $u$, which tends to pull the levers toward each other against suitable stops $u'$ $u^2$ on the yoke. $u^3$ is a lug projecting from the hub of the sliding clutch member and having a double-beveled or V-shaped front edge, and $u^4$ is a detent pivoted on the shifting-lever and normally pressed against the lug $u^3$ by a spring $u^5$ between the detent and the shifting-lever. A gravity-latch $u^6$, pivoted on the shifting-lever, normally rests with its free end in a seat at the upper end of the detent and holds the latter against movement away from the lug $u^3$ on the clutch member. $u^7$ represents a latch-tripping finger which swings from one arm of a bell-crank lever $u^8$, pivoted on the frame-yoke, and has a hook at its lower end adapted to engage under a shoulder on the latch. (See Figs. 9 to 11.) The other arm of the bell-crank lever $u^8$ is connected to the rod $s'$, which connects with the clutch-controlling bar S. In the normal or rest position the sliding clutch member is held out of engagement with its coöperating member against the action of its spring $t$ by the stronger spring $u$, connecting the shifting and safety levers, and the parts occupy the position shown in Fig. 9$^a$, the detent being held by the latch against the lug on the clutch member and pressing the lug over the top of a stationary projection $u^9$ on the frame-yoke and against the inclined face of a lug $u^{10}$ on the safety-lever. When the bell-crank lever $u^8$ is rocked by the depression of the clutch-controlling bar S, the trip-finger is lowered, and when the bar S and bell-crank lever are returned by the spring $s^2$ the trip-finger engages and lifts the latch $u^6$. The detent now being freed cannot hold the sliding clutch member, and the latter is moved by its spring $t$ into engagement with the coöperating clutch member, and the sliding clutch member and crank-shaft to which it is connected revolve, thus carrying the lug $u^3$ away from the detent $u^4$. The detent is then pressed out by its spring $u^5$ and the latch again drops into engagement with the detent. When the lug $u^3$ comes around into engagement with the beveled face $u^{11}$ of the detent, it and the clutch member are moved over until arrested by the engagement of the lug with the stationary projection $u^9$ on the yoke, thereby partially but not wholly disengaging the clutch-teeth, as shown in Fig. 9. As the space between the end of the detent and the stationary projection $u^9$ is less than the thickness of the lug $u^3$, the shifting-lever U is moved away from its stop, and the spring $u$, connecting the shifting and safety levers, is strained. As soon as the lug $u^3$ passes the stationary projection $u^9$ on the yoke the spring $u$ pulls the shifting-lever suddenly toward its stop and throws the sliding clutch member out of engagement with the other clutch member, the parts then being again in the rest position. (Shown in Fig. 9$^a$.) The engagement of the lug $u^3$ with the lug on the safety-lever stops the rotation of the clutch member and crank-shaft and prevents any over movement thereof. Thus the crank-shaft C makes one revolution and raises and lowers the cross-head of the perforating mechanism each time one of the rear gages is lowered to arrest the sheet. As the dog-carrier can only move, as above explained, when the crank-shaft is stationary, the rear gages are not released by the trip-dogs and raised until after the lifting of the cross-head.

In this machine the carriers travel continually and the sheets are arrested and held by the rear gages against the action of the traveling carriers. When released by the gages, the sheets are immediately moved again by the carriers, since the sheets are at all times under the influence of the traveling carriers. The traveling trip-dogs move along with the sheet and operate the several rear gages in succession at the proper times to arrest the sheet in the different positions necessary for making the successive lines of perforations.

Either of the rear gages can be rendered inactive when it is not required, as when a sheet is to have a less number of lines of perforations than there are rear gages. This is accomplished in the machine shown by the following means: A slotted space-block V, Figs. 14 and 16, straddles each rear gage-shaft between one end of the gage-sleeve and the adjacent bearing-block for the shaft and holds the sleeve in such position as to keep the rock-arm R and gear-segment in position to be actuated by the traveling trip-dogs.

The space-block is retained on the gage-shaft by a spring-clip $v$, which embraces the shaft and is held from movement by the engagement of a pin $v'$ on the adjacent bearing-block in one of two holes $v^2$ in the space-block. By removing the space-block the gage-sleeve can be shifted endwise on the gage-shaft and the rock-arm $q^3$ and gear-segment R also moved on the gage-shaft out of the path of the traveling trip-dogs, so that the latter can pass the rock-arm and gear-segment without actuating them and the gage and clutch mechanism which they control. To hold the parts in the shifted position, the space-block can be engaged on the gage-shaft between the opposite bearing-block and the gear-segment. The space-block is held in this new position, as in its original position, by the engagement of a pin $v^3$ on the bearing-block in the other of the two holes $v^2$ in the space-block. When the gage-sleeve is so shifted to its inoperative position, it is held against turning under the action of its spring by a stop-pin $v^4$, Fig. 14, which projects inwardly from the bearing-block $p^3$, toward which the gage-sleeve has been shifted and under which pin the adjacent gage-finger $p^2$ engages.

While the machine is especially designed for operating upon the sheets of paper and other light material by perforating the same, it is obvious that it might be applied to other purposes by providing the cross-head with the proper tools for effecting the desired operation.

I claim as my invention—

1. The combination of a tool for operating upon the sheet, mechanism for actuating said tool, means for moving the sheet past the tool, a gage movable into and out of the path of the sheet, an endless traveling carrier, and a gage-actuating device which is attached to said carrier and moved thereby in the direction of movement of the sheet for actuating said gage, substantially as set forth.

2. The combination of a tool for operating upon the sheets, mechanism for actuating said tool, means for moving the sheets past the tool, a gage movable into and out of the path of the sheets, and means which move intermittently in the direction of movement of the sheets for actuating said gage, substantially as set forth.

3. The combination of a tool for operating upon the sheet, mechanism for actuating said tool, means for moving the sheet past the tool, gages arranged one behind the other and movable into and out of the path of the sheets, an endless traveling carrier, and gage-actuating means attached to said carrier and moved thereby in the direction of movement of the sheet to actuate said gages successively, substantially as set forth.

4. The combination of a tool for operating upon the sheet, mechanism for actuating said tool, means for moving the sheet past the tool, gages arranged one behind the other in rear of the tool and movable into and out of the path of the sheet, and means which move intermittently in the direction of movement of the sheet for actuating said gages successively, substantially as set forth.

5. The combination of a tool for operating upon the sheet, mechanism for actuating said tool, means for moving the sheet past the tool, gages arranged one behind the other in rear of the tool and movable into and out of the path of the sheet, and means which moves the gages successively into the path of the sheet and which moves with the sheet and stops intermittently to hold the gages in the path of the sheet, substantially as set forth.

6. The combination of a tool for operating upon the sheets, mechanism for actuating said tool, means for moving the sheets past said tool, a gage movable into and out of the path of the sheets, a gage-actuating-device, and an endless traveling carrier for said device, substantially as set forth.

7. The combination of a tool for operating upon the sheets, mechanism for actuating said tool, means for moving the sheets past said tool, a gage movable into and out of the path of the sheets, a gage-actuating device, an endless traveling carrier for said device, and means for moving said carrier when the tool-actuating mechanism is at rest and stopping said carrier when the tool-actuating mechanism is in action, substantially as set forth.

8. The combination of a tool for operating upon the sheets, mechanism for actuating said tool, means for moving the sheets past said tool, a gage movable into and out of the path of the sheets, a gage-actuating dog, an endless traveling carrier on which said dog is movably mounted, and means for shifting said dog from its inoperative into its operative position for actuating the gage, substantially as set forth.

9. The combination of a tool for operating upon the sheets, mechanism for actuating said tool, means for moving the sheets past the tool, a gage movable into and out of the path of the sheets, a traveling series of trip-dogs, and means for setting the dogs into active position before reaching the gage and returning the dogs to inactive position after passing the gage, substantially as set forth.

10. The combination of a tool for operating upon the sheets, mechanism for actuating said tool, means for moving the sheets past the tool, a gage movable into and out of the path of the sheets, a traveling carrier provided with a series of trip-dogs normally in inactive position, and means for setting certain of said trip-dogs into active position at predetermined distances apart before reaching the gage, substantially as set forth.

11. The combination of a tool for operating upon the sheets, mechanism for actuating said tool, means for moving the sheets past the tool, a gage movable into and out of the path of the sheets, a traveling carrier provided with a series of trip-dogs normally in inactive position, and means for setting certain of said trip-dogs into active position at predetermined distances apart before reaching the gage, said setting means being adjustable to vary the distances between the active trip-dogs, substantially as set forth.

12. The combination of a tool for operating upon the sheets, mechanism for actuating said tool, means for moving the sheets past the tool, a gage movable into and out of the path of the sheets, a traveling carrier provided with a series of trip-dogs normally in inactive position, and means for setting certain of said trip-dogs into active position at predetermined distances apart before reaching the gage, said setting means being actuated by one trip-dog to set a succeeding trip-dog into active position, substantially as set forth.

13. In a machine of the character described, the combination of a device to be operated, a traveling carrier provided with a series of trip-dogs for operating said device, said trip-dogs being normally in inactive position, and means for setting certain of said trip-dogs into active position at predetermined distances apart before reaching said device to be operated, substantially as set forth.

14. In a machine of the character described, the combination of a device to be operated, a traveling carrier provided with a series of trip-dogs for operating said device, said trip-dogs being normally in inactive position, and means for setting certain of said trip-dogs into active position at predetermined distances apart before reaching said device to be operated, said setting means being adjustable to vary the distances between the active trip-dogs, substantially as set forth.

15. In a machine of the character described, the combination of a device to be operated, a traveling carrier provided with a series of trip-dogs for operating said device, said trip-dogs being normally in inactive position, and a lever for setting certain of said trip-dogs in active position, said setting-lever being moved by one trip-dog to set another trip-dog in active position, substantially as set forth.

16. In a machine of the character described, the combination of a device to be operated, a traveling carrier provided with a series of trip-dogs for operating said device, said trip-dogs being normally in inactive position, means for setting certain of said trip-dogs into active position at predetermined distances apart before reaching said device to be operated, said setting means being adjustable to vary the distances between the active trip-dogs, and a guide which holds the trip-dogs in active position and is shifted with the setting means in adjusting the latter, substantially as set forth.

17. In a machine of the character described, the combination of a device to be operated, a traveling carrier provided with a series of trip-dogs for operating said device, which trip-dogs are normally in inactive position, adjustable means for setting certain of said trip-dogs into active position at predetermined distances apart before reaching the device to be operated, and a flexible guide for holding the trip-dogs in active position, substantially as set forth.

18. In a machine of the character described, the combination of a device to be operated, a traveling carrier provided with a series of trip-dogs for operating said device, which trip-dogs are normally in inactive position, adjustable means for setting certain of said trip-dogs into active position at predetermined distances apart before reaching the device to be operated, a flexible guide for holding the trip-dogs in active position, and a part on said setting means which engages said guide and is moved along the same, in adjusting the setting means, for changing the position of the guide, substantially as set forth.

19. In a machine of the character described, the combination of a device to be operated, a traveling carrier provided with a series of trip-dogs for operating said device, said trip-dogs being normally in inactive position, means for setting certain of said trip-dogs into active position at predetermined distances apart before reaching the device to be operated, said setting means being adjustable to vary the distances between the active trip-dogs, and a flexible guide extending beside the carrier for holding the trip-dogs in active position, said setting means having a part slidably engaging said guide for holding the portion thereof in advance of the setting means nearer to said carrier than the other portion thereof, substantially as set forth.

20. The combination of a tool for operating upon the sheets, a gage movable into and out of the path of the sheet to stop or release the same, a device for actuating said gage, mechanism for operating said tool, a driving means for the same, and means controlled by said gage-actuating device for intermittently connecting said driving means with said tool-operating mechanism, substantially as set forth.

21. The combination of a tool for operating upon the sheet, mechanism for operating the tool, a gage movable into and out of the path of the sheet, a traveling device for actuating said gage, and a clutch mechanism controlled by said traveling device for intermittently actuating said tool-operating mechanism, substantially as set forth.

22. The combination of a tool for operating upon the sheet, a gage movable into and out of the path of the sheet, an intermittently-traveling device for actuating said gage, and mechanism which is controlled by said device for operating said tool and which also controls the intermittent movement of the traveling device, substantially as set forth.

23. The combination of a tool for operating upon the sheet, mechanism for operating the tool, a gage movable into and out of the path of the sheet, a traveling device for actuating said gage, a clutch mechanism which is actuated by said traveling device and sets the tool-operating mechanism in action, and mechanism which stops said traveling device when said tool-operating mechanism is in action, substantially as set forth.

24. The combination of a tool for operating upon the sheet, mechanism for operating the tool, a clutch mechanism which controls said operating mechanism, a gage movable into and out of the path of the sheet, a device which causes the engagement of said clutch mechanism, and a traveling device which actuates said gage and said clutch-engaging device, substantially as set forth.

25. The combination of a tool for operating upon the sheet, mechanism for operating the tool, a gage movable into and out of the path of the sheet, a traveling device for actuating said gage, and a clutch mechanism which controls the operation of said tool-operating mechanism and the movement of said traveling device and includes a device which causes the engagement of the clutch and is actuated by said traveling device, said traveling device being constructed and arranged to release said clutch-engaging device before it releases said gage, substantially as set forth.

26. The combination of a tool for operating upon the sheet, a continually-rotating driving-shaft, an intermittently-rotated shaft which actuates said tool, a clutch mechanism for connecting said shafts periodically, a device which causes the engagement of said clutch mechanism, a gage movable into and out of the path of the sheet, and a traveling dog which actuates said gage and said clutch-engaging device, substantially as set forth.

27. The combination of a tool for operating upon the sheet, mechanism for operating the tool, a gage which is movable into and out of the path of the sheet, a rock-arm for said gage, a clutch mechanism controlling said tool-operating mechanism and including a gear-segment and plunger arranged beside said rock-arm, and a traveling device which actuates said rock-arm and gear-segment, substantially as set forth.

28. The combination of a tool for operating upon the sheet, mechanism for operating said tool intermittently, a gage which is movable into and out of the path of the sheet, an intermittently-traveling device for actuating said gage, and mechanism connecting said tool-operating mechanism and said gage device and constructed to cause the movement of said gage-actuating device when said tool-operating mechanism is at rest, substantially as set forth.

29. The combination of a tool for operating upon the sheet, mechanism for operating said tool intermittently, a gage which is movable into and out of the path of the sheet, an intermittently-traveling device for actuating said gage, a clutch mechanism controlled by said gage-actuating device for starting and stopping said tool-operating mechanism, and gearing connecting said tool-operating mechanism and said gage-actuating device and constructed to cause the movement of said gage-actuating device when said tool-operating mechanism is at rest, substantially as set forth.

30. The combination of a tool for operating upon the sheet, mechanism for operating the tool, gages arranged one behind the other and movable into and out of the path of the sheet, a traveling device for actuating said gages successively, and a clutch mechanism also controlled by said traveling device for starting said tool-operating mechanism each time one of said gages is actuated, substantially as set forth.

31. The combination of a tool for operating upon the sheets, mechanism for operating the tool, a clutch mechanism for starting said tool-operating mechanism, gages arranged one behind the other and movable into and out of the path of the sheets to stop and release the same, a traveling device for actuating said gages successively, and controlling devices for said clutch mechanism which are also actuated successively by said traveling device, substantially as set forth.

32. The combination of a tool for operating upon the sheet, mechanism for operating said tool intermittently, a carrier for feeding the sheet past the tool, a gage movable into and out of the path of the sheet, a traveling device for actuating said gage, and gearing connecting said tool-operating mechanism and gage-actuating device and constructed to cause said gage-actuating device to move when said tool-operating mechanism is at rest, substantially as set forth.

33. The combination of a tool for operating upon the sheet, mechanism for operating said tool intermittently, a carrier for feeding the sheet past the tool, a gage movable into and out of the path of the sheet, a traveling device for actuating said gage, and gearing connecting said tool-operating mechanism, sheet-carrier and gage-actuating device and constructed to cause a continuous movement of the sheet-carrier and an intermittent movement of said gage-actuating device, substantially as set forth.

34. The combination of a tool for operating upon the sheet, a rotary driving-shaft, an intermittently-rotated shaft for actuating said tool, a clutch mechanism for connecting said shafts periodically, a gage movable into and out of the path of the sheet, a device for actuating said gage and said clutch mechanism, a carrier for said actuating device, and a planet-gear which is geared with said rotary shaft and said intermittently-rotated shaft and which causes said carrier to move when said intermittently-rotated shaft is at rest, substantially as set forth.

35. The combination of a tool for operating upon the sheet, a rotary driving-shaft, an intermittently-rotated shaft for actuating said tool, a clutch mechanism for connecting said shafts periodically, a trip device for causing the engagement of said clutch, a gage movable into and out of the path of the sheet, a traveling device for actuating said gage and said trip device, a carrier for said gage-actuating device, and a planet-gear which is geared with said rotary shaft and said intermittently-rotated shaft and which causes said carrier to move when said intermittently-rotated shaft is at rest, substantially as set forth.

36. The combination of a gage-shaft, means for adjusting and securing the same, a gage-sleeve journaled on said shaft, a rock-arm for the sleeve journaled on said shaft, a spring connecting said sleeve and rock-arm, and means for rocking said arm, substantially as set forth.

37. The combination of a gage-shaft, a gage-sleeve journaled on said shaft, means for rocking said sleeve, gear-pinions secured to the opposite ends of said shaft, rock-bars with which said pinions mesh to maintain the parallelism of the shaft in adjusting it, one of said pinions being releasably secured to the shaft, whereby the shaft can be set obliquely, and means for securing said shaft, substantially as set forth.

38. The combination of a gage-shaft, a gage-sleeve journaled on said shaft, an arm connected to said sleeve, means for engaging said arm to rock said sleeve, a removable space-block on said shaft for holding said sleeve and arm in position for the arm to be engaged by said means, said arm being movable out of operative position when said space-block is removed, and means for securing said space-block on the shaft in position to hold said arm in inoperative position, substantially as set forth.

Witness my hand this 5th day of July, 1905.

FREDERICK HART.

Witnesses:
E. M. MEEKS,
F. E. HART.